(12) United States Patent
Su et al.

(10) Patent No.: US 8,199,709 B2
(45) Date of Patent: Jun. 12, 2012

(54) METHOD AND APPARATUS FOR WIRELESS COMMUNICATION

(75) Inventors: Jiun Jang Su, Taipei (TW); Chih Hao Yeh, Yonghe (TW)

(73) Assignee: MediaTek, Inc., Hsinchu Science Park, Hsinchu (TW)

( * ) Notice: Subject to any disclaimer, the term of this patent is extended or adjusted under 35 U.S.C. 154(b) by 597 days.

(21) Appl. No.: 12/347,358

(22) Filed: Dec. 31, 2008

(65) Prior Publication Data
US 2010/0165973 A1    Jul. 1, 2010

(51) Int. Cl.
*H04W 4/00*    (2009.01)
*H04J 3/00*    (2006.01)

(52) U.S. Cl. ............................ 370/329; 370/345
(58) Field of Classification Search .............. None
See application file for complete search history.

(56) References Cited

U.S. PATENT DOCUMENTS

| | | | | |
|---|---|---|---|---|
| 2007/0281617 A1* | 12/2007 | Meylan et al. | | 455/41.2 |
| 2008/0080555 A1* | 4/2008 | Carter et al. | | 370/470 |
| 2008/0279163 A1 | 11/2008 | Desai | | |
| 2008/0318630 A1 | 12/2008 | Gil | | |

OTHER PUBLICATIONS

The European Search Report from the corresponding European Application No. 09010280.7 dated Apr. 23, 2010.

* cited by examiner

*Primary Examiner* — John Blanton
(74) *Attorney, Agent, or Firm* — Snell & Wilmer L.L.P.

(57) ABSTRACT

A method for operating an electronic device using a first and a second communication protocols is provided. The electronic device includes an arbitrator to determine whether to communicate in accordance with the first or second communication protocol. The method estimates a period for transmitting a trigger frame by the electronic device, a period for receiving a first acknowledgement (ACK) frame by the electronic device, a period of a backoff procedure, a period for receiving a predetermined number of delivered frames by the electronic device, and a period of transmitting a second ACK frame by the electronic device. All the above estimated periods are added to be a predetermined time period. The trigger frame is transmitted to initiate the electronic device to communicate in accordance with the first communication protocol. The arbitrator determines whether to grant the electronic device to communicate in accordance with the second communication protocol based on the predetermined time period.

17 Claims, 9 Drawing Sheets

PRIOR ART

PRIOR ART

METHOD AND APPARATUS FOR WIRELESS COMMUNICATION

FIELD OF INVENTION

The present invention generally relates to wireless communications, and more particularly to an apparatus and a method for communicating via multiple communication protocols while avoiding transmission interference.

BACKGROUND OF THE INVENTION

In recent years, the research dedicated to the mobile communication devices is on the increase due to their portable convenience. It may be advantageous to combine two or more wireless techniques into one apparatus, system or method. However, a deficiency in combining two or more wireless communication techniques is that the transmission and reception of two wireless communication techniques may interfere with each other, especially when two or more wireless communication techniques operate within the same frequency band.

For example, both Bluetooth and WLAN protocols generally operate in the 2.4 GHz (2.4000-2.4835 GHz) Industrial, Scientific, and Medical (ISM) unlicensed band. Bluetooth is a frequency hopping protocol, while WLAN is working at a central frequency. If Bluetooth hops in a frequency same as WLAN's central frequency, WLAN's frame may be corrupted by Bluetooth's packet. On the other hand, Bluetooth's frame is also affected if it hops into WLAN's working channel. When Bluetooth and WLAN modules are collocated on a board, the scenario goes even worse because any one's transmission power may saturate the other's receiver via the board. Accordingly, IEEE 802.15.2 provides solutions to this problem. One of the mitigation schemes discussed in IEEE 802.15.2 is Packet traffic arbitration (PTA) scheme.

The PTA technique provides a time division multiplexing (TDM) approach. FIG. 1 shows an electronic apparatus 100 employing the PTA mechanism. As shown, a WLAN module 120 and a Bluetooth module 130 are collocated with each other. The WLAN module 120 includes an IEEE 802.11 MAC 122, which communicates with an IEEE 802.11 PLCP+PHY layer control block 124. The Bluetooth module 130 similarly includes an IEEE 802.15.1 LM+LC block 132, which communicates with an IEEE 802.15.1 baseband controller 134. A PTA controller 110 is provided to determine which of the WLAN module 120 and the Bluetooth module 130 will be allowed to transmit at a given moment. The PTA controller 110 includes a WLAN (802.11b) control part 112 and a Bluetooth (802.15.1) control part 114, and they receive current status information 144 and 154 from each of the WLAN module 120 and the Bluetooth module 130. When the WLAN module 120 intends to transmit, it sends a transmission request 140 to the WLAN control part 112 and waits for the WLAN control part 112 to reply with a transmission confirmation 142 before proceeding to the transmission. Similarly, when the Bluetooth 130 intends to transmit, it sends a transmission request 150 to the Bluetooth control part 114 and waits for the Bluetooth control part 114 to reply with a transmission confirmation 152 before proceeding to the transmission.

The existing implementation assumes that the WLAN module 120 provides Internet connectivity and the Bluetooth module 130 provides handset and earphone connection. Thus, the PTA 110 grants the transmission request of the Bluetooth module 130 solely relying on information from Bluetooth module 130 without consideration of the traffic characteristic of the WLAN module 120. Consequently, a Bluetooth's packet has higher priority than a WLAN's frame, and therefore will have to interrupt ongoing WLAN traffic and result in interference of the WLAN link.

FIG. 2 shows the architecture of a voice over Internet protocol (VoIP) application. The mobile device 200 includes a WLAN module 220, a Bluetooth module 230, and a processor 205 for associating the WLAN module 220 with the Bluetooth module 230. The WLAN module 220 connects to Internet 270 via an Access Point (AP) 260 under IEEE 802.11 protocol, and the Bluetooth module 230 communicates with a Bluetooth device 250 (such as a handset or an earphone) via the Bluetooth protocol. Since conversation between the mobile device 200 and a remote device (not shown) over the Internet is carried by the WLAN module 220 and the Bluetooth module 230 together, the frame of the WLAN module 220 is as important as the packet of the Bluetooth module 230.

In addition to the priority issue, the distributed nature of WLAN protocol may cause WLAN module 220 to fail to receive a packet from the AP 260 when the PTA grants the Bluetooth module 230 access to the shared medium instead of granting the WLAN module 220 access to the shared medium. For this issue, IEEE 802.11e specifies an unscheduled APSD power delivery mechanism. According to the unscheduled APSD mechanism, the WLAN module 220 notifies the AP 260 that it is going to enter a power-saving mode, and the frames arranged to be transmitted to the WLAN module 220 will be buffered in the AP 260 until the AP 260 receives a frame called "QoS data-typed frame" as notification that the WLAN module is granted to operate. Then, the AP 260 will transmit an acknowledgement (ACK) frame to acknowledge receipt of the QoS data-typed frame. As conventionally designed, the WLAN module 220 will keep active for the duration of a frame-exchange, i.e. the periods of the transmission of the QoS data-typed frame and the receipt of its acknowledgement. Therefore, after the duration of a frame-exchange expires, i.e. after the WLAN module 220 receives the ACK frame, the Bluetooth module 230 may be granted access of the shared medium and the WLAN module 220 will not be granted for access the shared medium. However, at this time, the AP 260 may start to deliver the buffered frames to WLAN module 260.

Therefore, it is desirable to provide an apparatus and a method to grant the utilization of a plurality of wireless communication techniques while reducing the interference among the plurality of wireless communication techniques.

SUMMARY OF THE INVENTION

The present invention is better suited when considering VoIP and Bluetooth in a WLAN with Quality of Service (QoS) capability. The coexistence scheme of the present invention can apply to an electronic device having a WLAN module collocated with a Bluetooth module. The electronic device notifies an AP that it's going to use IEEE 802.11e U-APSD. When the coexistence scheme grants the WLAN module to transmit a trigger frame, the grant shall last for a predetermined duration, wherein the duration is estimated according to a period for transmitting the trigger frame by the electronic device, a period for receiving a first acknowledgement (ACK) frame by the electronic device, a period of a backoff, a period for receiving a predetermined number of delivered frames by the electronic device, and a period of transmitting a second ACK frame.

In one embodiment, the present invention provides a method for operating an electronic device using a first and a second communication protocols. The method includes a step of estimating a period for transmitting the trigger frame by the electronic device, a period for receiving a first acknowledgement (ACK) frame by the electronic device, a period of a backoff, a period for receiving a predetermined number of delivered frames by the electronic device, and a period of transmitting a second ACK frame. All the estimated periods are accumulated to be a time period for enabling the electronic device to communicate in accordance with the first communication protocol. The method further includes a step of transmitting a trigger frame to initiate the electronic device to communicate in accordance with the first communication protocol, and a step of determining whether to grant the electronic device to communicate in accordance with the second communication protocol based on the time period.

Moreover, in another exemplary embodiment, the present invention provides a wireless electronic device including a first module configured to operate in accordance with a first communication protocol, a second module configured to operate in accordance with a second communication protocol, and an arbitrator coupled to the first module and the second module. The arbitrator is configured to determine whether to grant the first module and not grant the second module or grant the second module and does not grant the first module based on a predetermined time period. The wireless electronic device is granted to communicate in accordance with the first communication protocol during the predetermined time period, wherein the predetermined time period is calculated by adding a period for transmitting said trigger frame by said electronic device, a period for receiving a first acknowledgement (ACK) frame by said electronic device, a period of a backoff, a period for receiving a predetermined number of delivered frames by said electronic device, and a period of transmitting a second ACK frame.

BRIEF DESCRIPTION OF THE PICTURES

The foregoing objects and other objects together with the advantages of this invention will become more readily appreciated as the same becomes better understood by reference to the following detailed description, when taken in conjunction with the accompanying drawings, wherein.

DETAILED DESCRIPTION OF THE INVENTION

In order to accomplish the foregoing features and functions, the present invention discloses a coexistence method for different protocols using the same frequency band. The present invention will be described more fully hereinafter with reference to the FIGS. 3-9. However, the devices, elements, and methods in the following description are configured to illustrate the present invention, and should not be construed in a limiting sense.

Figure 1:
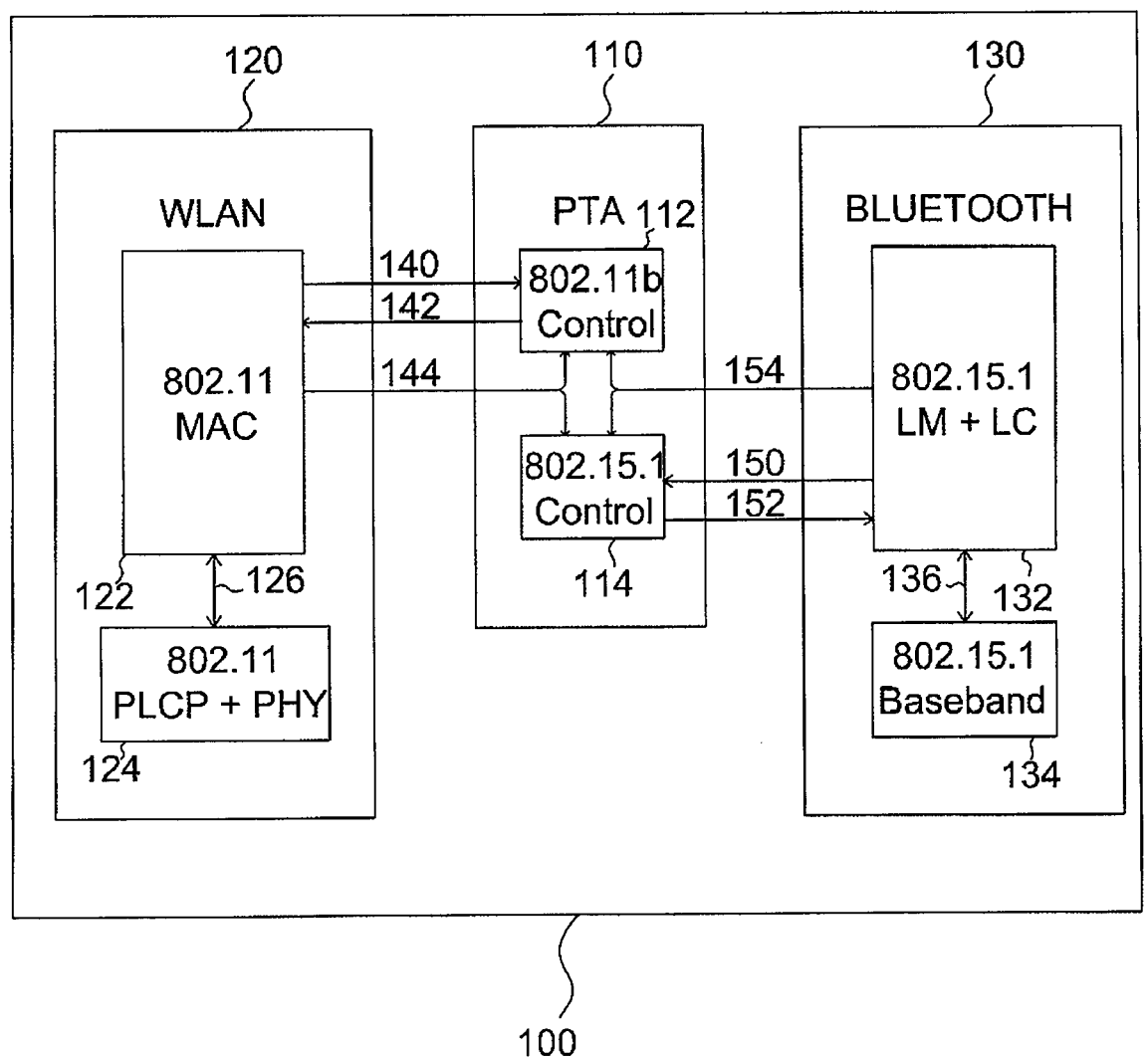
FIG. 1 shows a known structure of a PTA entity.
Figure 2:
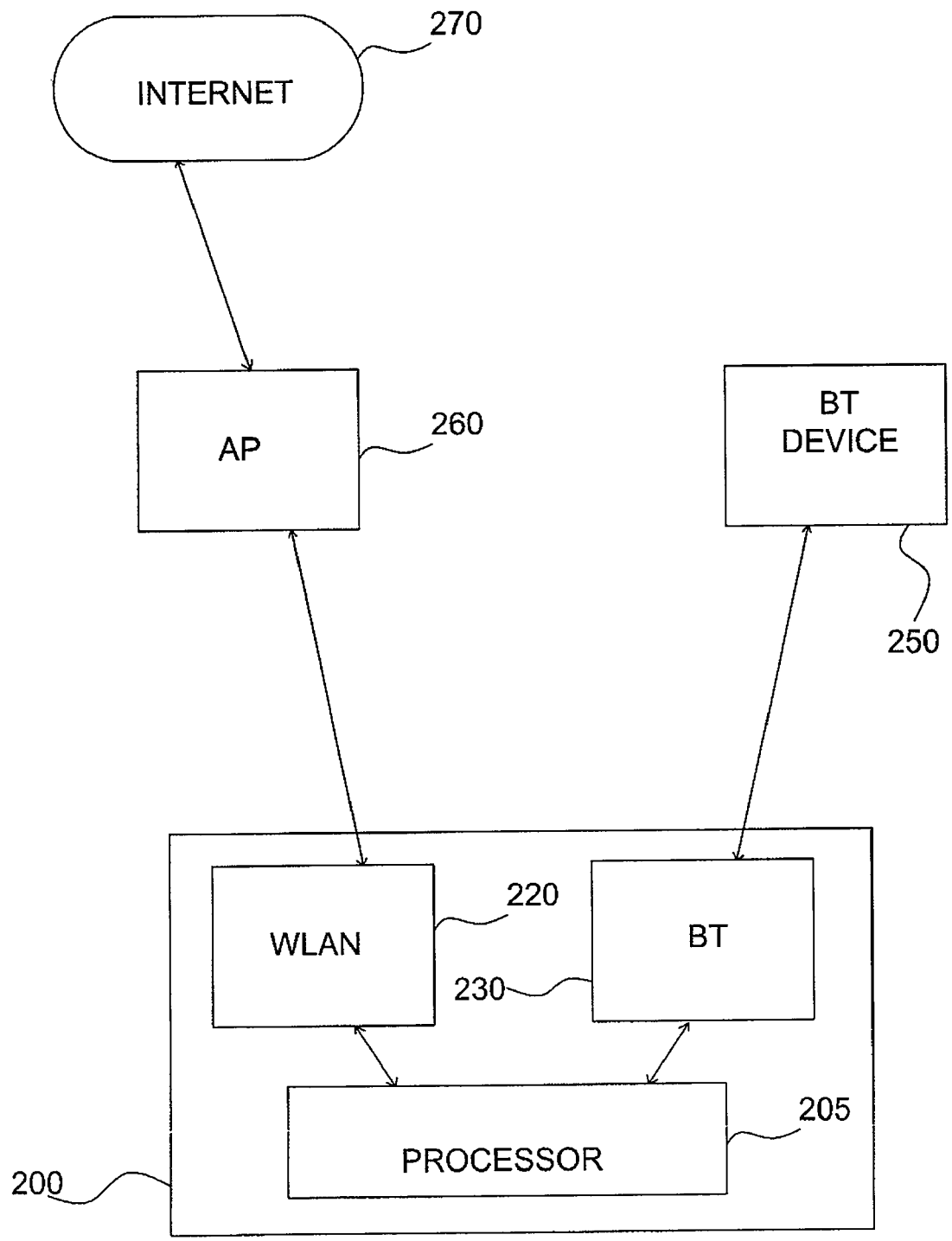
FIG. 2 shows a known architecture of a voice over Internet protocol (VoIP) application.
Figure 3:
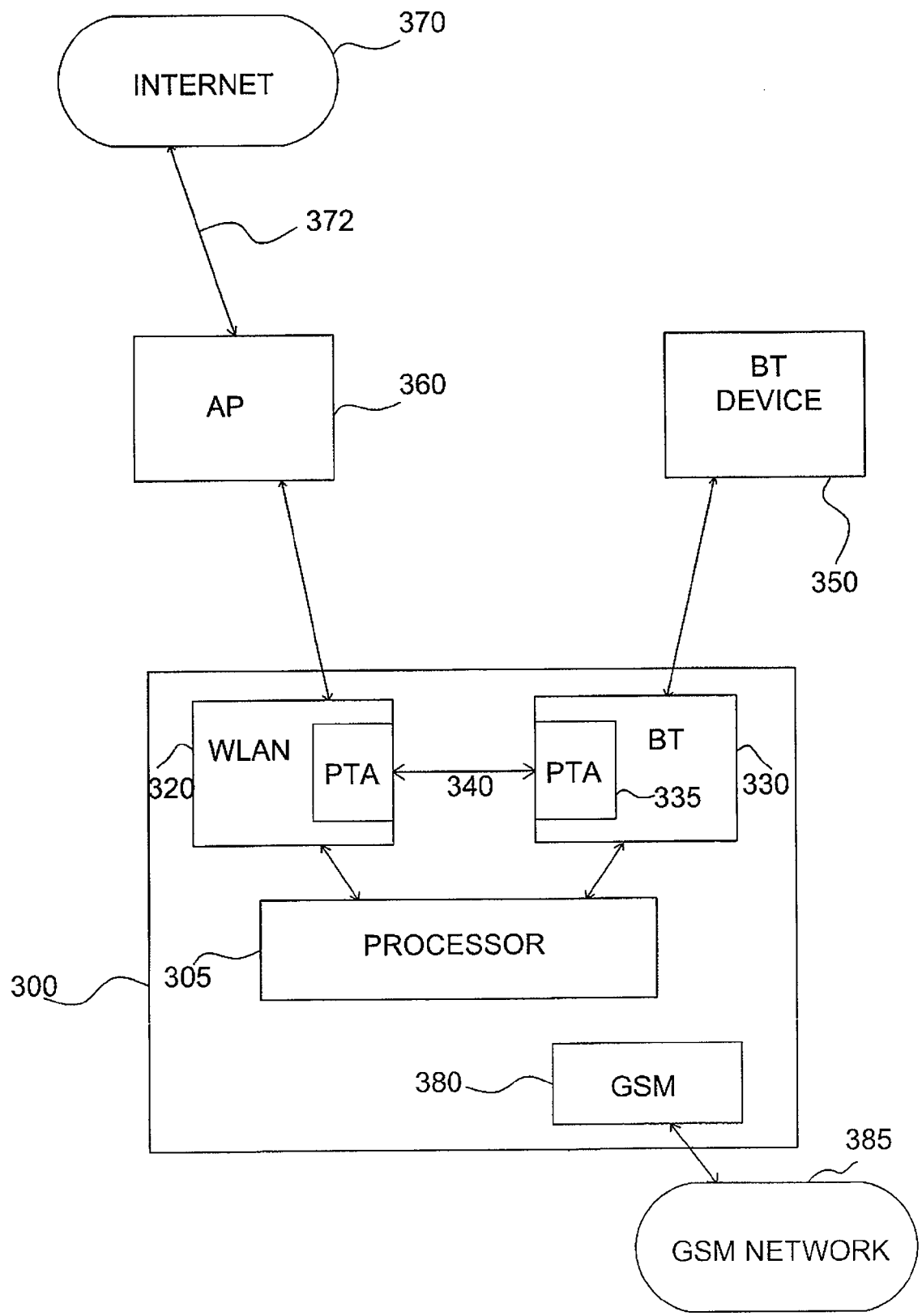
FIG. 3 shows an electronic device having a WLAN module collocated with a Bluetooth module according to an embodiment of the present invention.

FIG. 3 shows an electronic device 300 having a WLAN module 320 collocated with a Bluetooth module 330 according to an embodiment of the present invention. The WLAN module 320 communicates with an access point (AP) 360 via IEEE 802.11 protocol, and the AP 360 connects to Internet 370 through a physical wire 372. Therefore, the WLAN module 320 can communicate with Internet 370. On the other hand, the Bluetooth module 330 communicates with a Bluetooth device 350 via Bluetooth protocol. An example of the Bluetooth device 350 is an earphone or a handset. A processor 305, including desired logic, circuitry, and/or other control units, well known to those skilled in the art, is coupled to both the WLAN module 320 and the Bluetooth module 330. In addition, the electronic device 300 may also include a GSM module 380 to connect with the GSM network 385.

A Packet Traffic Arbitration (PTA) technique is implemented in the electronic device 300 to determine the transmission of transmitting a Bluetooth packet or a WLAN frame and then to deny a communication request that would result in collision or interference. For saving the chip size, two PTA controllers 325 and 335 are embedded in the WLAN module 320 and the Bluetooth module 330 respectively. In other words, the Bluetooth module 330 and WLAN module 320 share part of PTA's job functions. However, the PTA controllers 325 and 335 can be integrated into one PAT controller and implemented in the WLAN module only or implemented as a separate module.

IEEE 802.11e specification defines a strategy for delivering buffered frames in the AP 360 to the WLAN module 320, which is known as Automatic Power Save Delivery (APSD). There are two types of APSD: scheduled APSD and unscheduled APSD. The difference between these two APSDs is the initiation of the "service period", which is the time period during which the WLAN module 320 is presumed granted to receive a frame transmitted by the AP 360. With scheduled APSD, the service period starts automatically without special signaling frames to notify the AP 360 that the WLAN module 320 is awake and ready to receive frames. With unscheduled APSD, the service period is initiated by transmitting a "Quality of Service (QoS) data-typed frame" to the AP 360 from the WLAN module 320, wherein the "QoS data-typed frame" is called a trigger frame in the present invention.

The present invention employs the unscheduled APSD mechanism. The electronic device 320 notifies the AP 360 that it is going to use IEEE 802.11e U-APSD, and the unscheduled service period will begin when the AP 360 receives a trigger frame from the WLAN module 320. During the unscheduled service period, the PTA controllers 325 and 335 will not grant the Bluetooth module 330 from transmitting and receiving signals to prevent interference between collocated WLAN module 320 and Bluetooth module 330. When the unscheduled service period ends, the WLAN module 320 will enter a sleep mode (i.e. a power-saving mode) and the Bluetooth module 330 will wake up. A signal "Grant-N" 340 is introduced to represent the unscheduled service period, which is pulled to high level from the beginning of the trigger frame and lasts for a specific duration, which will be described in detail below.

Figure 4:
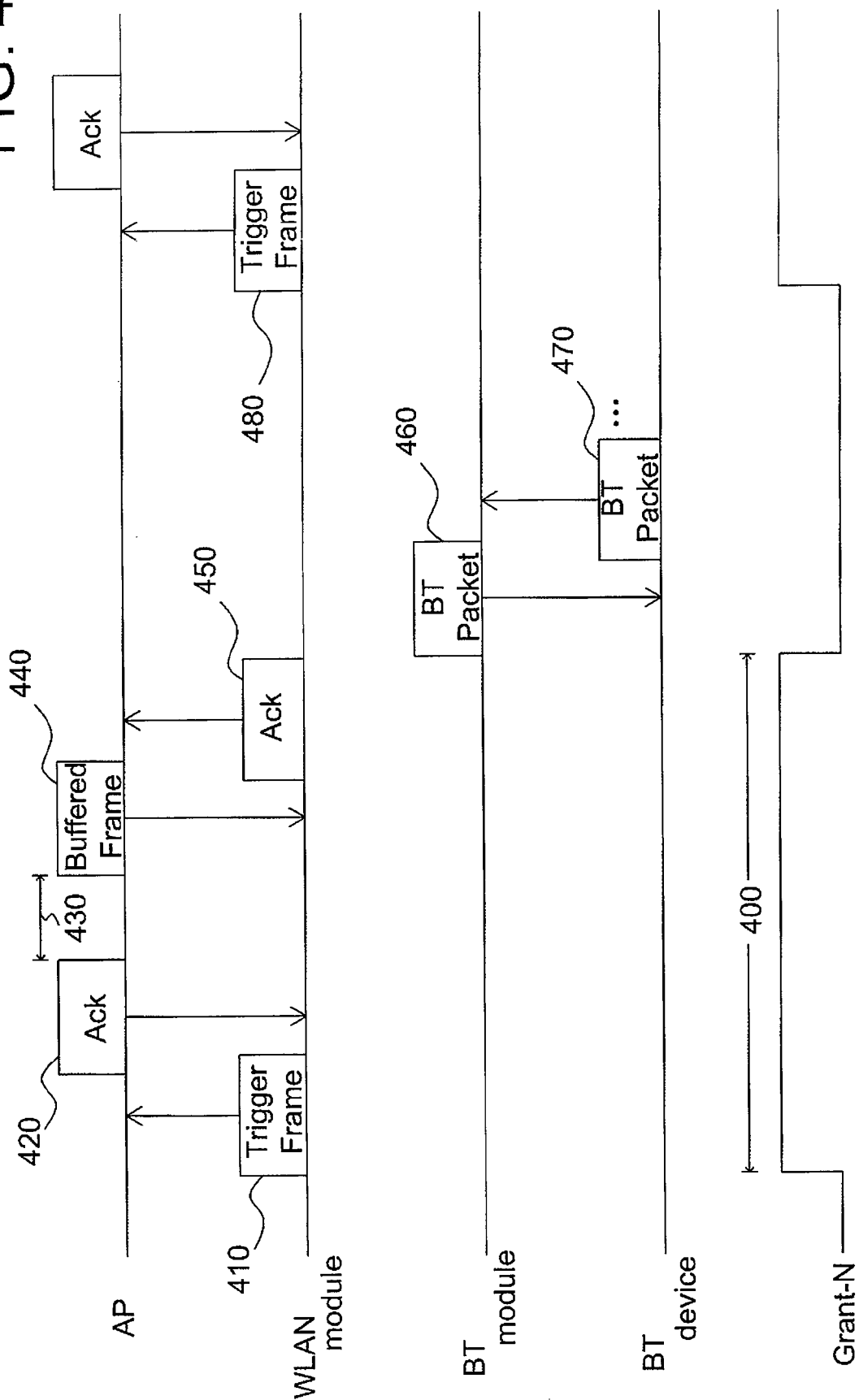
FIG. 4 is a schematic diagram of an embodiment of the present invention illustrating a timing diagram between the operation of WLAN and Bluetooth modules of FIG. 3.

FIG. 4 is a timing diagram illustrating the operation of WLAN module 320 and Bluetooth module 330 of FIG. 3 according to an embodiment of the present invention. At first, WLAN module 320 is in the sleep mode, and the Grant-N is at low level. When the WLAN module 320 is in the sleep mode, the AP 360 will buffer the frames to be transmitted to the WLAN module 320. If the WLAN module 320 intends to communicate with the AP 360, it transmits a request to the PTAs 325, 335 for requesting transmission. After granted by the PTAs 325 and 335, the Grant-N signal is pulled to a high level while the WLAN module 320 transmits a trigger frame 410 to the AP 360 at the time allocated by the PTAs 325, 335 and an unscheduled service period 400 is initiated. The trigger frame 410 also informs the AP 360 to perform an unscheduled automatic power save delivery (U-APSD) mechanism. After the AP 360 receives the trigger frame 410, it will transmit an acknowledgment (ACK) frame 420 to the WLAN module 320 in order to proceed with the communication.

There is a backoff procedure 430 before the AP 360 delivers the buffered frames to the WLAN module 320. The backoff procedure 430 is caused by the fundamental access method of IEEE 802.11, which is Carrier Sense Multiple Access with Collision Avoidance (CSMA/CA) working by a "listen before talk" scheme. This means that a station (such as WLAN module 320) intending to transmit must first sense the transmission channel to determine if another station is transmitting. The CSMA/CA protocol avoids collisions among stations sharing the medium by utilizing a random backoff time if the station physical or logical sensing mechanism indicates a busy traffic. In one embodiment of the present invention, the WLAN module 320 calculates its own average backoff period and treats it as the backoff period of the AP 360, since the AP 360 and the WLAN module 320 have approximately equal transmission opportunities according to the CSMA/CA protocol.

After the backoff procedure 430, the AP 360 starts to transmit the buffered frames 440 to the WLAN module 320. The number of frames transmitted to the WLAN module 320 during each unscheduled service period may be determined in advance, such as 2, 4, or 6 frames, or may be unlimited. After receiving the predetermined number of frames, the WLAN module 320 transmits an acknowledgment frame 450 to the AP 360 for acknowledging receipt of the buffered frames 440. Then, the Grant-N signal is pulled to a low level to end the unscheduled service period 400. The Bluetooth module 330 is not granted during the unscheduled service period 400 to prevent interference, and granted as the unscheduled service period 400 ends, i.e. as the Grant-N signal pulled low.

Bluetooth protocol is organized into a Master-Slave architecture and a slave is only allowed to transmit after having been polled by a master. Bluetooth protocol operates in the 2.4 GHz ISM band, and, in this band, 79 channels spaced 1 MHz apart are defined. The channel is divided into time slots, and the master starts its transmission in even-numbered time slots only, and the slave starts its transmission in odd-numbered time slots only. In this embodiment, the Bluetooth module 330 acts as a master and the Bluetooth device 350 acts as a slave. After the Grant-N pulled low, the Bluetooth module 330 begins the communication with the Bluetooth device 350 by transmitting packets 460 to the Bluetooth device 350 and then the Bluetooth device 350 transmits packets 470 if any to the Bluetooth module 330. The Bluetooth module 330 and the Bluetooth device 350 alternatively transmits until the WLAN module 320 transmits next trigger frame 480 to initiate the next unscheduled service period. The Grant-N signal, representing unscheduled service periods, grants the WLAN module 320 and does not grant the Bluetooth module 330 during each unscheduled service period and grants the Bluetooth module 330 and does not grant the WLAN module 320 outside each unscheduled service period.

According to the embodiment shown in FIG. 4, a predetermined time period is calculated by adding a period for transmitting the trigger frame by the WLAN module 320, a period for receiving a first ACK frame from the AP 360, a period of a backoff procedure, a period for receiving a predetermined number of delivered frames from the AP 360, and a period of transmitting a second ACK frame by the WLAN module 320. The length of the service period 400 will be determined based on the calculated predetermined time period.

Figure 5:
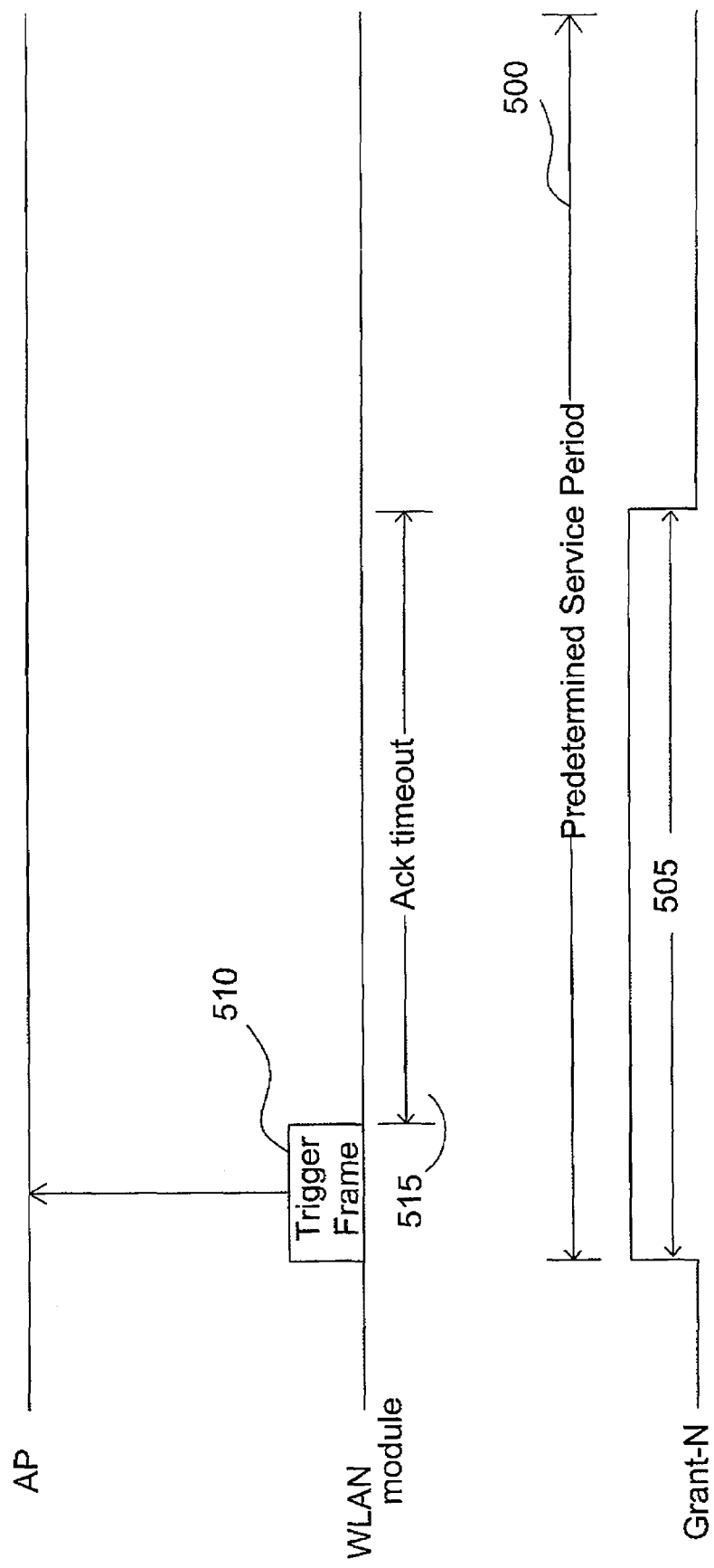
FIG. 5 illustrates a timing diagram between the operation of WLAN and Bluetooth modules of FIG. 3 according to another embodiment of the present invention.

FIG. 5 is a timing diagram illustrating the operation of WLAN module 320 and Bluetooth module 330 of FIG. 3 according to another embodiment of the present invention. After the WLAN module 320 transmits a trigger frame 510 to the AP 360 to initiate an unscheduled service period 505, it is expected to receive an ACK frame of the trigger frame 510. The present invention incorporates an ACK timeout period 515 for checking whether the ACK frame of the trigger frame 510 has been received. If no ACK frame is received by the WLAN module 320 within the ACK timeout period, Grant-N signal will be pulled down to end the unscheduled service period 505, i.e. to not grant the WLAN module 320 and grant the Bluetooth module 330, even though a predetermined service period 500 calculated according to the diagram of FIG. 4 has not expired.

Figure 6:
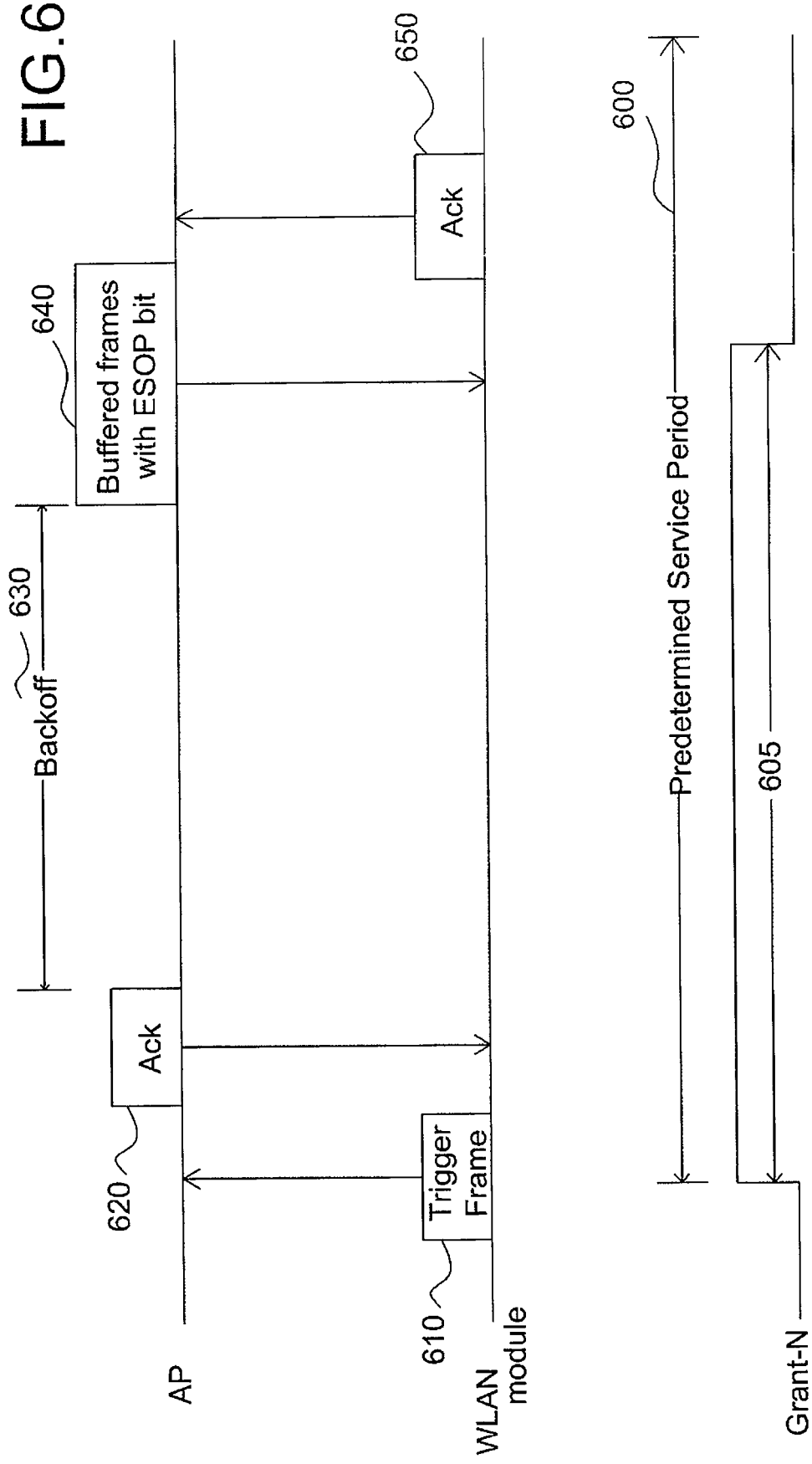
FIG. 6 illustrates a timing diagram between the operation of WLAN and Bluetooth modules of FIG. 3 according to yet another embodiment of the present invention.

FIG. 6 is a timing diagram illustrating the operation of WLAN module 320 and Bluetooth module 330 of FIG. 3 according to yet another embodiment of the present invention. The WLAN module 320 transmits a trigger frame 610 to AP 360 to initiate a service period 605, and then receives an ACK frame 620 from the AP 360. After a period of a backoff procedure 630, the AP 360 delivers buffered frames 640 to the WLAN module 320. In order to indicate that there are no more frames to be transmitted or a period for transmitting frames has been reached, an EOSP (end of service period) bit is designated. The AP 360 sets the EOSP bit to 1 in the last frame it transmits in order to signal the WLAN module 320 that the AP 360 will not transmit any more frames until the next service period and the WLAN 320 can go back to the sleep mode. In this embodiment, the WLAN module 320 transmits an ACK frame 650 to AP 360 in response to receiving a frame with EOSP=1, and the Grant-N signal is pulled to a low level to end the service period 605 even though the predetermined service period 600 calculated according to the diagram of FIG. 4 has not expired. Alternatively, if there is no frame buffered, the AP 360 will transmit a null frame to inform the WLAN module 320, and the WLAN module 320 will transmit the ACK frame 650 in response to receiving the null frame and then go into the sleep mode.

Figure 7:
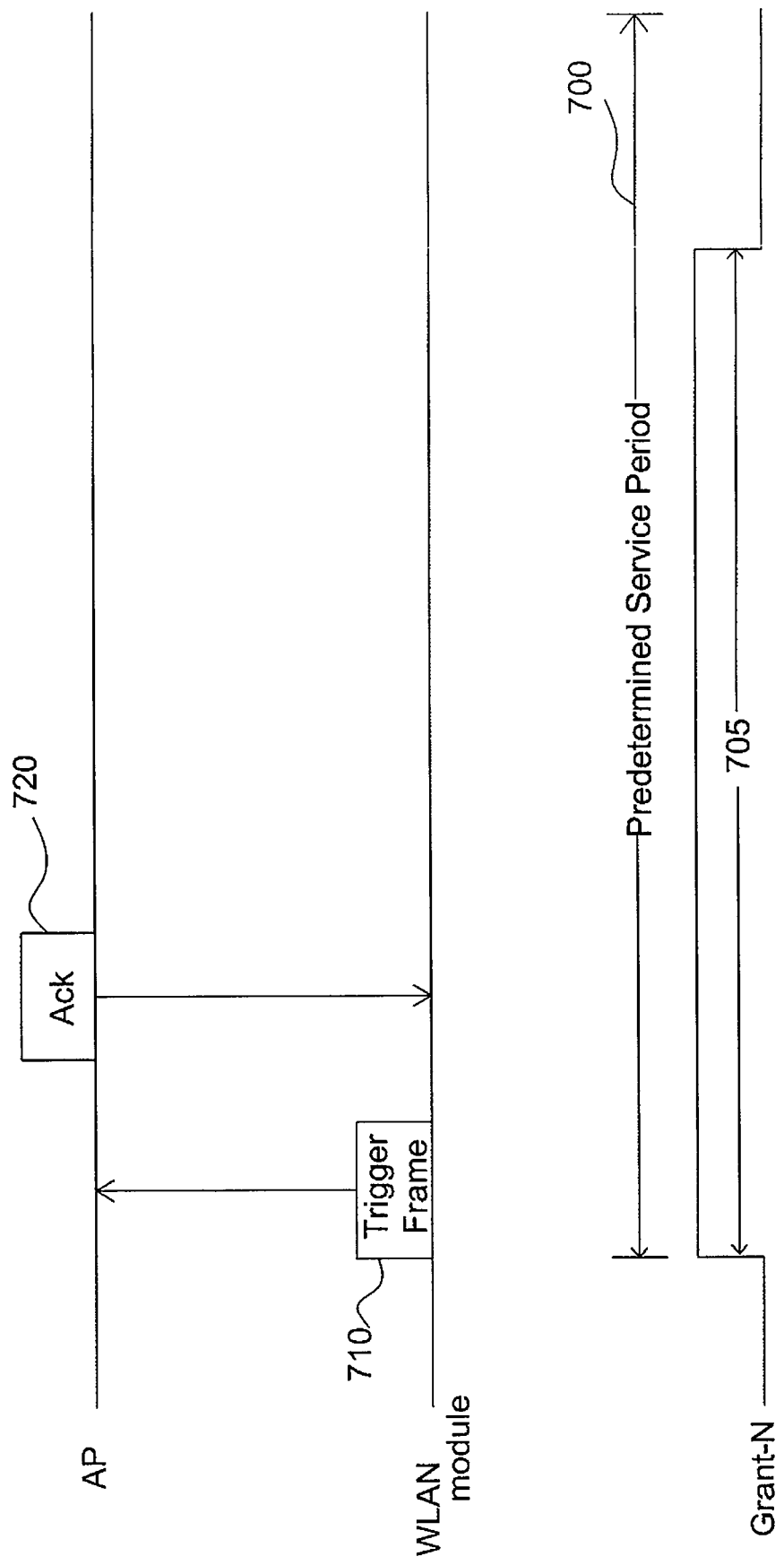
FIG. 7 illustrates a timing diagram between the operation of WLAN and Bluetooth modules of FIG. 3 according to yet another embodiment of the present invention.

FIG. 7 is a timing diagram illustrating the operation of WLAN module 320 and Bluetooth module 330 of FIG. 3 according to yet another embodiment of the present invention. The WLAN module 320 transmits a trigger frame 710 to AP 360 to initiate a service period 705, and then receives an ACK frame 720 from the AP 360. If the WLAN module 320 receives no frame from AP 360 (either buffered frames or null frame) after receiving the ACK frame 720, the service period 705 will last until a predetermined service period 700 calculated according to the diagram of FIG. 4 expires.

Figure 8:
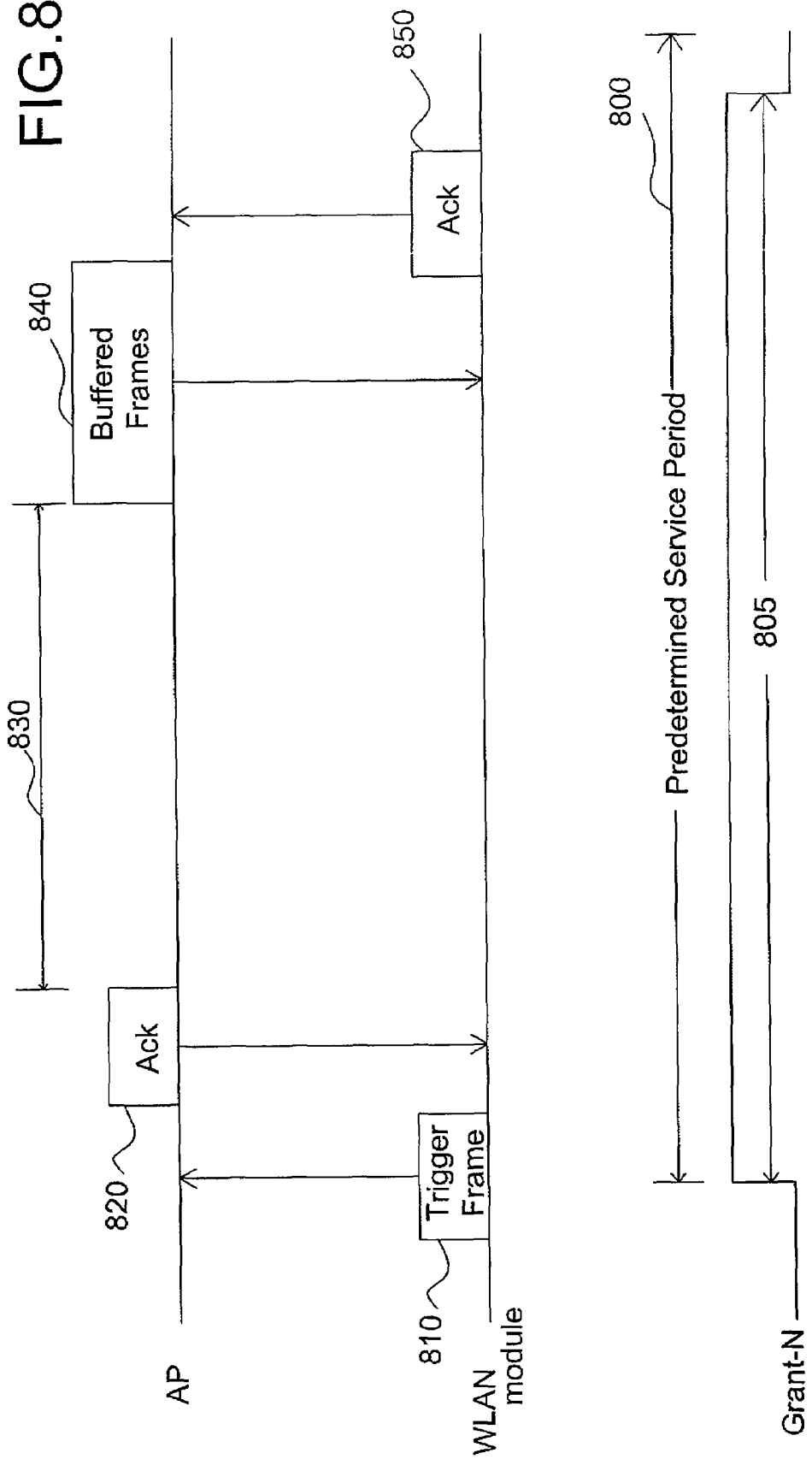
FIG. 8 illustrates a timing diagram between the operation of WLAN and Bluetooth modules of FIG. 3 according to yet another embodiment of the present invention.

FIG. 8 is a timing diagram illustrating the operation of WLAN module 320 and Bluetooth module 330 of FIG. 3 according to yet another embodiment of the present invention. The WLAN module 320 transmits a trigger frame 810 to AP 360 to initiate a service period 805, and then receives an ACK frame 820 from the AP 360. The period of a backoff procedure 830 in this embodiment is relatively long due to, for example, collisions or transmission errors. The long period of the backoff procedure 830 may result that the WLAN module 320 is in the act of receiving a frame when the predetermined service period 800 calculated according to the diagram of FIG. 4 is ended. In this case, the Grant-N signal will keep in high level to continue enabling the operation of the WLAN module 320 at least until the frame is received completely. If the received frame is recognized as a destined frame (i.e. a frame from the AP 360), the WLAN module 320 will send an ACK frame 850 in response to the receipt of the frame, and then the Grant-N signal will be pulled to low level to end the service period 805. Alternatively, if the received frame is recognized as an undestined frame, the Grant-N signal will be pulled to low level immediately to end the service period 805 without transmitting the ACK frame 850.

Figure 9:
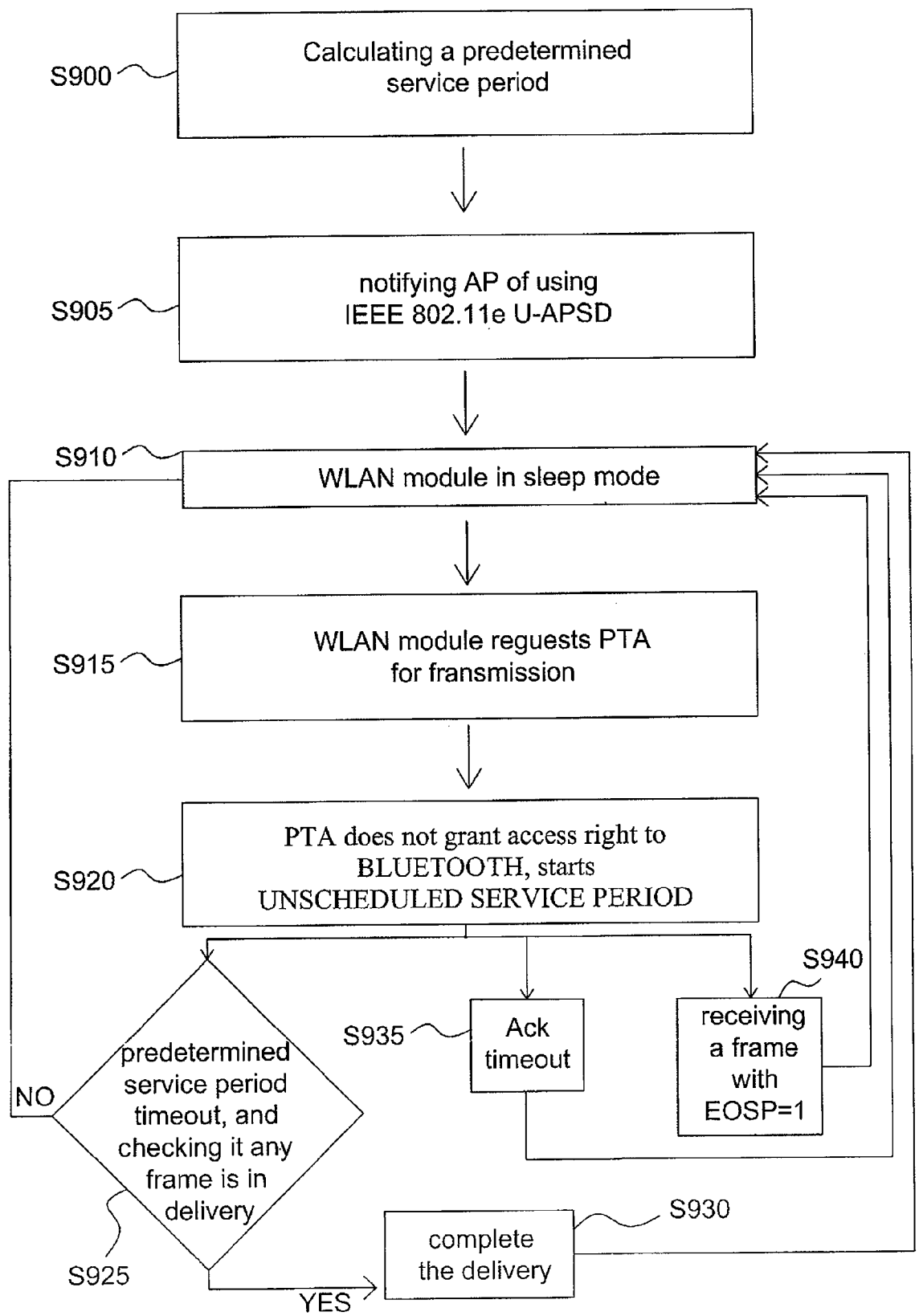
FIG. 9 is a flowchart diagram of an exemplary method illustrating the operation of an electronic device shown in FIG. 3.

FIG. 9 is a flowchart diagram of an exemplary method illustrating the operation of an electronic device with a WLAN module collocated with a Bluetooth module in accordance with an embodiment of the present invention. The electronic device further includes an arbitrator to arbitrate whether the WLAN module or the Bluetooth module is allowed to access shared medium, wherein the WLAN module can communicate with an AP via IEEE 802.11 protocol, and the Bluetooth module can communicate with a Bluetooth device via Bluetooth protocol. In step S900, a predetermined service period for enabling the WLAN module to communicate is calculated by adding the following estimated periods: a period for transmitting a trigger frame by the WLAN module, a period for receiving a first ACK frame by the WLAN module, an average period of a backoff procedure, a period for receiving a predetermined number of delivered frames by the WLAN module, and a period of transmitting a second ACK frame by the WLAN module. The average period of the backoff procedure can be determined by the WLAN module 320 according to the known formula. According to the IEEE 802.11e, the predetermined number of delivered frames can be 2, 4, 6 or unlimited, etc.

In step S905, the electronic device notifies the AP that it is going to use IEEE 802.11e unscheduled automatic power save delivery (U-APSD) mechanism. Under the U-APSD mechanism, the WLAN module alternates between active mode and sleep mode, wherein only the WLAN module is granted to communicate with the AP in the active modes. In step S910, the WLAN module is in the sleep mode (power-saving mode) in which the AP does not transmit but buffers the frames. In step S915, the WLAN module attempts to wake up from the sleep mode due to timer event or transmitting request event and requests the arbitrator for transmission.

In the step S920, the WLAN module transmits a trigger frame to the AP to initiate an unscheduled service period after granted by the arbitrator; meanwhile, the arbitrator prohibits the Bluetooth module from receiving or transmitting signals. In general, the unscheduled service period in which the WLAN module is granted to communicate with the AP will last for a predetermined service period calculated in step S900. In step S925, when the timeout of the predetermined service period happens, the arbitrator will check if any frame is in the act of delivery. If not, the procedure will go back to step S910 that the arbitrator will not grant the WLAN module and allow the Bluetooth module to communicate with the Bluetooth device. If there is a frame in the act of delivery in step S925, the arbitrator will continue to grant the WLAN module in step S930 until the WLAN module sends an ACK frame in response to the receipt of the frame completely and the recognition of the received frame as a destined frame, or until the frame is received completely and recognized as an undestined frame. Then, the unscheduled service period is ended, and the procedure goes back to step S910. In the condition of step S930, the unscheduled service period is longer than the predetermined service period.

As the unscheduled service period is initiated in step S920, the AP is supposed to transmit an ACK frame to the WLAN module 320 in response to the receipt of the trigger frame, and then transmits the buffered frames to the WLAN module after a backoff procedure. However, if the WLAN module doesn't receive any ACK frame from the AP when a predetermined ACK timeout happens, the method proceeds from step S920 to step S935 to end the unscheduled service period. Then, the procedure goes back to step S910. In another embodiment, the WLAN module receives the ACK frame and starts to receive the buffered frames after the backoff procedure. If the WLAN module receives a frame with EOSP=1, the method proceeds to step S940 to end the service period even though the predetermined service period has not expired. Then, the procedure goes back to step S910. In the condition of step S935 or step S940, the unscheduled server period is shorter than the predetermined service period.

The Bluetooth and WLAN are different protocols and ever competed each other for adoption. However, their uniqueness makes them both accepted by market. To better satisfy customers' needs, coexistence between Bluetooth and WLAN must be considered holistically. One aspect of the present invention is to improve the VoIP quality for a handset using WLAN as an Internet interface and using Bluetooth as an earphone device interface. A Packet Traffic Arbitration mechanism proposed in IEEE 802.15.2 specification is employed in the present invention to improve communication performance. More information shared between Bluetooth and WLAN modules shall improve co-existence scheme.

The present invention is mainly configured to improve the communication quality of a wireless electronic device using two different protocols by reducing the interferences between these two protocols. Especially, the present invention is more advantageous when two protocols are operating in the same frequency, such as, but not limited to, the WLAN protocol and the Bluetooth protocol.

Although the specific embodiments of the present invention have been illustrated and described, it is to be understood that the invention is not limited to those embodiments. One skilled in the art may make various modifications without departing from the scope or spirit of the invention.

The invention claimed is:

1. A method for operating an electronic device using a first and a second communication protocols, comprising:
estimating a period for transmitting a trigger frame by said electronic device, a period for receiving a first acknowledgement (ACK) frame by said electronic device, a period of a backoff procedure, a period for receiving a predetermined number of delivered frames by said electronic device, and a period of transmitting a second ACK frame by said electronic device;
adding all said estimated periods to be a predetermined time period;
transmitting said trigger frame to initiate said electronic device to communicate in accordance with said first communication protocol; and
determining whether to grant said electronic device to communicate in accordance with said second communication protocol based on said predetermined time period,
wherein said electronic device is granted to communicate in accordance with said first communication protocol while not granted from communicating in accordance with said second communication protocol, wherein said electronic device is granted to communicate in accordance with said second communication protocol while not granted from communicating in accordance with said first communication protocol, and wherein the following steps before said predetermined time period is ended: checking whether said first ACK frame is received within an ACK timeout period; and enabling said electronic device to communicate in accordance with said second communication protocol if said first ACK frame is not received when said ACK timeout period is ended.

2. The method of claim 1, wherein when said predetermined time period is ended, said electronic device is granted to communicate in accordance with said second communication protocol.

3. The method of claim 1, before said predetermined time period is ended, further comprising a step of checking whether said second ACK frame is sent.

4. The method of claim 3, further comprising a step of enabling said electronic device to communicate in accordance with said second communication protocol when said second ACK frame is sent.

5. The method of claim 4, wherein said second ACK frame is sent when said electronic device receives a frame with an End of Service Period (EOSP) bit.

6. The method of claim 1, further comprising the following steps when said predetermined time period is ended: checking if said electronic device is receiving a frame; enabling said electronic device to communicate in accordance with said first communication protocol until said frame is received completely; and determining if said frame is a destined frame; and if said frame is said destined frame, enabling said electronic device to communicate in accordance with said second communication protocol when said second ACK frame is sent.

7. The method of claim 1, further comprising the following steps when said predetermined time period is ended: checking if said electronic device is receiving a frame; enabling said electronic device to communicate in accordance with said first communication protocol until said frame is received completely; and determining if said frame is a destined frame; and enabling said electronic device to communicate in accordance with said second communication protocol when said frame is determined as not said destined frame.

8. The method of claim 1, wherein said electronic device comprises a first module corresponding to said first communication protocol, a second module corresponding to said second communication protocol, and a Packet Traffic Arbitration (PTA) coupled to said first module and said second module, and said step of transmitting said trigger frame comprises: said first module requesting said PTA for transmit said trigger frame; and said PTA prohibiting said second module from receiving or transmitting signals when said electronic device communicating in accordance with said first communication protocol.

9. The method of claim 1, wherein said electronic device utilizes an Unscheduled automatic power save delivery (U-APSD) mechanism to communicate with an Access Point (AP) in accordance with said first communication protocol.

10. The method of claim 1, wherein said first communication protocol is IEEE 802.11 protocol, and said second communication protocol is Bluetooth protocol.

11. A wireless electronic device, comprising:
a first communication circuit configured to operate in accordance with a first communication protocol;
a second communication circuit configured to operate in accordance with a second communication protocol; and
an arbitrator circuit coupled to the first communication circuit and the second communication circuit, configured to determine whether to grant the first communication circuit and not grant the second communication circuit or grant the second communication circuit and not grant the first communication circuit based on a predetermined time period;
wherein the predetermined time period is calculated by adding a period for transmitting said trigger frame by said first communication circuit, a period for receiving a first acknowledgement (ACK) frame by said first module communication circuit, a period of a backoff procedure, a period for receiving a predetermined number of delivered frames by said first communication circuit, and a period of transmitting a second ACK frame by said first communication circuit,
wherein when said arbitrator grants said wireless electronic device to communicate in accordance with said first communication protocol, said first module transmits said trigger frame to initiate said predetermined time period, and
wherein if first ACK is not received by said first communication circuit during an ACK timeout period, said arbitrator circuit grants said second communication circuit and does not grant said first communication circuit when said ACK timeout period is ended.

12. The wireless electronic device of claim 11, wherein the first communication circuit utilizes an Unscheduled automatic power save delivery (U-APSD) mechanism to communicate with an Access Point (AP) in accordance with said first communication protocol.

13. The wireless electronic device of claim 11, wherein when said predetermined time period is ended, said arbitrator circuit grants said second communication circuit and does not grant said first communication circuit.

14. The wireless electronic device of claim 11, wherein when said second ACK frame is sent, said arbitrator circuit grants said second communication circuit and does not grant said first communication circuit.

15. The wireless electronic device of claim 11, wherein when said electronic device receives a frame with an End of Service Period (EOSP) bit, said first communication circuit sends said second ACK frame.

16. The wireless electronic device of claim 11, wherein if said first communication circuit is receiving a frame when said predetermined period is ended, said arbitrator circuit grants said first communication circuit and does not grant said second communication circuit at least until the frame is received completely.

17. The wireless electronic device of claim 11, wherein said first communication protocol is IEEE 802.11 protocol, and said second communication protocol is Bluetooth protocol.

* * * * *